Patented Aug. 5, 1941

2,251,765

UNITED STATES PATENT OFFICE 2,251,765

ESTERS OF MALEIC ACID AND UNSATURATED ALCOHOLS

Ben Edmund Sorenson, Upper Darby, Pa., assignor to E. I. du Pont de Nemours & Company, Wilmington, Del., a corporation of Delaware No Drawing. Application May 17, 1940,
Serial No. 335,790

11 Claims. (Cl. 260—485)

This invention relates to esters of polycarboxylic acids and unsaturated alcohols and more particularly to maleic acid esters of unsaturated alcohols and their preparation and polymerization.

Esters of maleic acid and some unsaturated alcohols cannot be prepared by direct esterification procedures since the usual acid catalyst or even the maleic anhydride itself causes molecular rearrangement of the alcohol to an aldehyde. Esters of this type are usually prepared by the ester interchange reaction using a lower alkyl ester as methyl or ethyl maleate and reacting with an excess of the unsaturated alcohol in the presence of a metallic alcoholate. The usual catalyst is metallic sodium or potassium added as such to the reaction mixture in which instance it forms the alcoholate, or previously converted into the alcoholate by treatment with e. g. methyl or ethyl alcohol and so used. Such catalysts are usually satisfactory for most ester interchange reactions. In the case of esters of maleic acid, however, there is a definite tendency for a secondary reaction to take place thus materially reducing the yield of unsaturated ester desired and making separation of the secondary product and purification of the ester difficult. While the exact nature of these secondary reactions has not been determined the indications are that additional unsaturated alcohol combines with the ester in the alpha-beta double bond resulting in the formation of ether-ester derivatives. This product is probably formed according to the following reaction:

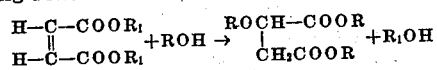

$R_1$ is ethyl or methyl and R is an allyl or methallyl residue. Other catalysts as alkali hydroxides either in the solid form or in alcoholic solution, litharge and calcium oxide have been used as well as the metallic alcoholates noted above. In view of the potential value of the maleic acid esters of certain unsaturated alcohols suitable means for producing these materials in high yields are highly desirable.

This invention has as an object the provision of means for preparing esters of maleic acid and unsaturated alcohols. A further object is the preparation of such esters in high yields substantially free of contaminating secondary reaction products.

Another object is the preparation of monomeric and polymeric compounds of the maleic acid esters of unsaturated alcohols. Still another object is the preparation of interpolymers of maleic acid esters of unsaturated alcohols and other polymerizable materials. A still further object is the preparation of synthetic organic finishes of a new type. Another object is the preparation of such monomeric and polymeric esters as solvents and plasticizers. Other objects will appear hereinafter.

These objects are accomplished by the following invention in which an alkyl maleate is reacted with an unsaturated alcohol in the presence of metallic aluminum as a catalyst.

The invention will be more fully understood by the following examples which are given by way of illustration but not by way of limitation except in so far as defined in the appended claims. The parts are by weight.

EXAMPLE I

| | |
|---|---|
| Dimethyl maleate | 144 parts (1 mol) |
| Methallyl alcohol | 288 parts (4 mols) |
| Aluminum (metal) | 1 part |

The aluminum was dissolved in 65 parts of additional methallyl alcohol.

The dimethyl maleate and the methallyl alcohol were charged into a one liter round bottomed flask and the flask attached to a four foot packed column having a fractionating head. The charge was heated and slowly distilled until the vapor temperature reached 110° C. at which point it was considered dry. The aluminum catalyst solution was then added over a period of time in three successive portions as follows: 20% at the start; 25% after 2 hours and 55% after 4 hours. The heating was continued and the methyl alcohol formed was removed by fractionation by drawing the distillate off slowly and maintaining the reflux temperature at 64–65° C. until practically all of the methanol is removed. The temperature at this point rapidly rose to 88° C. A total of 80 cc. (63 parts) of methanol were removed, the theoretical amount which should be obtained from 1 mol of dimethyl maleate being 81 cc. (64 parts).

The reaction mixture is then fractionated without removal of the aluminum catalyst. The excess methallyl alcohol was first removed at 40 mm. pressure and then the dimethallyl maleate at 2.5–3 mm. pressure.

The dimethallyl maleate had a boiling point of 124–127° C. at 2.5–3 mm. pressure when distilled rapidly.

The yield was 212 parts. Theoretical yield based on dimethyl maleate used is 224 parts. Percentage yield obtained was 94.7.

When the reaction is carried out using metallic sodium or calcium as the catalyst the yield of dimethallyl maleate is approximately only one-half that obtained when metallic aluminum is used.

EXAMPLE II

| | |
|---|---|
| Dimethyl maleate | 1440 parts (10 mols) |
| Methallyl alcohol | 2165 parts (30 mols) |
| Aluminum | 5 parts |

The procedure as described under Example I was followed in carrying out the reaction except that the aluminum was added directly (in the form of foil) to the dried reaction mixture and was allowed to dissolve during the reaction. The aluminum foil was activated by contacting it with a solution of mercuric chloride in methyl alcohol until a reaction set in. The mol ratio of methallyl alcohol to dimethyl maleate it will also be noted was reduced from 4:1 as in Example I to 3:1.

The actual yield of dimethallyl maleate obtained was 2100 parts or 93.75% of the theoretical yield of 2240 parts based on the dimethyl maleate used.

EXAMPLE III

Diallyl maleate

| | Parts |
|---|---|
| Dimethyl maleate | 280 |
| Allyl alcohol | 390 |
| Aluminum foil | 2 |

The dimethyl maleate and the allyl alcohol were charged into a round bottomed flask and the flask attached to a 4 foot bead packed column having a fractionating head. The charge was distilled to remove water as the alcohol binary (B. P. 88° C.) until the vapor temperature reached 94–95° C. The aluminum foil was then activated by heating for a short time in a methyl alcoholic solution of mercuric chloride until it was amalgamated. The amalgamated foil was then added to the substantially water free reaction mixture and the mixture distilled by maintaining the vapor temperature at 64–66° C. until 81 parts of methanol were removed.

The reaction mixture was then distilled at 35 mm. pressure, until the liquid temperature reached 140° C., in order to remove the excess allyl alcohol. The pressure in the reaction vessel was then reduced to 5 mm. and the diallyl maleate distilled.

A yield of 349 grams was obtained which is 89% of the theoretical yield based on the dimethyl maleate.

Constants of the material obtained were: Boiling point 114–116° C. at 5 mm.; sp. gr. at 25° C. 1.0705; refractive index $nD25$ 1.4661.

Constants for the dimethallyl maleate were: sp. gr. at 25° C. 1.0345; refractive index $nD25$ 1.4675; saponification number 507 (theoretical 501).

It will be observed from the examples that the excess alcohol used in the reaction may vary widely without affecting the yield of pure ester obtained. Such variation may conveniently range between 3 and 4 mols of alcohol per mol of maleic ester. For practical reasons it is not desirable to use too great an excess since no advantage accrues therefrom. When the alkali metal alcoholates and other materials previously noted are used as catalysts large excesses of alcohol favor the formation of a greater proportion of the secondary reaction product which is objectionable where it is desired to obtain the pure ester.

As noted in the examples the aluminum catalyst may be added as such to the reaction mixture or it may be dissolved in the alcohol and added to the reaction mixture in this form. It has been observed that where the aluminum is added to the reaction mass as such the reaction proceeds at a somewhat more rapid rate. The aluminum surface may be activated if desired by amalgamating slightly by rubbing with mercury or by dipping or other ways, e. g. a methyl alcohol solution of mercuric chloride. The amount of aluminum as catalyst based on the dimethyl maleate may conveniently vary between 0.35% and 0.70%. The best results are obtained when the aluminum catalyst dissolves slowly over a period of three to four hours as the reaction proceeds. This may be conveniently accomplished by activating about one-half of the surface of the aluminum. In some instances, if the reaction does not start when the aluminum has dissolved it may be necessary to add more metal. This indicates that the reaction mixture was not dry when the catalyst was added. In this invention magnesium and other catalytic metals are not the equivalent of aluminum.

In carrying out the ester interchange reaction, it is necessary to have the reaction mixture substantially free of water in order to obtain the proper interchange or in other words to conserve and make the catalyst effective for the reaction. Further if the reaction mass is not substantially free of water the aluminum catalyst will not satisfactorily dissolve.

The time of the reaction will vary with the amount of catalyst employed, with the type of apparatus used, with the rate at which the methanol is removed and with other factors incident to this type of reaction. These conditions are well known and their adjustment and control will be readily apparent to those skilled in the art of carrying out such reactions. A reaction period of from 4 to 8 hours under suitably controlled conditions has been found to yield satisfactory and desirable results.

The dimethallyl maleate monomer which is a colorless, limpid liquid may be used in this form as a baking film forming material for decorative and protective coatings. The monomer may also be readily polymerized by heating at about 200° C. in the absence of solvents. The material may also be polymerized by the use of an organic peroxide or by use of other effective polymerization accelerators. If desired, the dimethallyl maleate may be polymerized by heating in solution. The maleate monomers are soluble in many of the more common organic solvents as aliphatic and aromatic hydrocarbons, esters, ketones, alcohols, and the like. Further the ester may be interpolymerized with drying oils as linseed, Chinawood, dehydrated castor oil, etc., and with semi-drying oils as soya bean oil, etc. These interpolymers suitably pigmented produce enamel finishing compositions which when applied to suitable surfaces as e. g. metal, etc. form after being baked, hard, tough and durable films. The polymerized methallyl maleate may be suitably pigmented and used as an enamel composition, and on being baked produces a hard and durable film or coating. This film or coating may, however, for some purposes be somewhat more brittle than desired. Various other uses for the methallyl maleate as such or interpolymerized with other polymerizing materials will present themselves to those skilled in the art of using such materials. The monomeric or polymeric ester may be used as a solvent or plasticizer in the preparation of various types of coating and other compositions.

It will be apparent from the foregoing that I have devised a means for preparing esters of maleic acid and unsaturated alcohols, as dimethallyl maleate, in high yields substantially free of contaminating secondary reaction products which is simple and economical. Such products as previously indicated are polymerizable and form interpolymers with other polymerizable materials from which products may be formed synthetic organic finishes of a new type.

It is apparent that many widely different embodiments of this invention may be made without departing from the spirit and scope thereof and therefore it is not intended to be limited except as indicated in the appended claims.

I claim:

1. The process which comprises reacting an alkyl ester of a lower alpha-beta unsaturated dicarboxylic acid and a lower olefinic monohydric alcohol in the presence of aluminum.

2. The process of claim 1 in which the aluminum is first treated with a solution of mercuric chloride.

3. The process of claim 1 in which the aluminum is dissolved in one of the ingredients of the reaction and is added to the reaction mixture in portions during the progress of the reaction.

4. The process of reacting dimethyl maleate and an allyl alcohol which comprises refluxing a mixture thereof in the presence of aluminum.

5. The process of claim 4 in which the alcohol is allyl alcohol.

6. The process of claim 4 in which the alcohol is methallyl alcohol.

7. The process which comprise refluxing about 1 mol of dimethyl maleate with about 4 mols of methallyl alcohol and adding thereto aluminum dissolved in methallyl alcohol, and after two hours adding a second portion of aluminum solution, and after four hours a further portion, and thereafter purifying the reaction product, said aluminum being added in catalytic amounts.

8. In the process of preparing monomeric esters by reacting an alkyl maleate with an allyl alcohol, the improvement which comprises reacting the said ingredients in the presence of aluminum.

9. The process of claim 8 in which the aluminum is in the form of foil and is activated by contacting it with a solution of mercuric chloride in methyl alcohol.

10. The process of claim 8 in which the aluminum is amalgamated.

11. The process of preparing organic compounds which comprises reacting an alkyl maleate and an allyl alcohol in the presence of aluminum, separating the allyl maleate formed by distillation, and thereafter polymerizing the said ester by heating.

BEN EDMUND SORENSON.